United States Patent
Kim et al.

(10) Patent No.: US 10,333,115 B2
(45) Date of Patent: Jun. 25, 2019

(54) TRAY FOR CURVED SURFACE-STRUCTURED BATTERY CELL

(71) Applicant: LG CHEM, LTD., Seoul (KR)

(72) Inventors: Han Chul Kim, Daejeon (KR); Seog Jin Yoon, Daejeon (KR); Se Woo Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 140 days.

(21) Appl. No.: 15/024,545

(22) PCT Filed: Sep. 4, 2014

(86) PCT No.: PCT/KR2014/008309
§ 371 (c)(1),
(2) Date: Mar. 24, 2016

(87) PCT Pub. No.: WO2015/046779
PCT Pub. Date: Apr. 2, 2015

(65) Prior Publication Data
US 2016/0276636 A1 Sep. 22, 2016

(30) Foreign Application Priority Data
Sep. 30, 2013 (KR) .................. 10-2013-0116908

(51) Int. Cl.
*H01M 2/10* (2006.01)
*H01M 2/02* (2006.01)

(52) U.S. Cl.
CPC ....... *H01M 2/1022* (2013.01); *H01M 2/0202* (2013.01); *H01M 2002/0205* (2013.01); *H01M 2220/30* (2013.01)

(58) Field of Classification Search
CPC ............. H01M 2/1022; H01M 2/0202; H01M 2002/0205
See application file for complete search history.

(56) References Cited

U.S. PATENT DOCUMENTS

| | | | |
|---|---|---|---|
| 6,577,101 B1* | 6/2003 | Takeshita | H01M 2/1022 320/112 |
| 2003/0039883 A1 | 2/2003 | Notten et al. | |
| 2005/0130030 A1* | 6/2005 | Watanabe | H01M 2/0404 429/100 |
| 2008/0057384 A1 | 3/2008 | Jang et al. | |

(Continued)

FOREIGN PATENT DOCUMENTS

| | | |
|---|---|---|
| EP | 2 306 566 A1 | 4/2011 |
| EP | 2306566 A1 | 4/2011 |

(Continued)

OTHER PUBLICATIONS

Extended European Search Report, dated Jul. 22, 2016, for European Application No. 14849591.4.

(Continued)

*Primary Examiner* — James Lee
(74) *Attorney, Agent, or Firm* — Birch, Stewart, Kolasch & Birch, LLP

(57) ABSTRACT

Disclosed herein is a battery cell tray for receiving a secondary battery that can be repeatedly charged and discharged. More particularly, there is provided a battery cell tray having a curved battery cell receiving part that is capable of improving dimensional stability of a curved battery cell.

17 Claims, 3 Drawing Sheets

(56) References Cited

U.S. PATENT DOCUMENTS

2009/0191450 A1    7/2009  Kim
2012/0183825 A1    7/2012  Lee et al.
2013/0308282 A1*   11/2013 Shin ........................ H05K 7/14
                                                                361/749

FOREIGN PATENT DOCUMENTS

| JP | 2003-045390 A   | 2/2003 |
| JP | 2004-103472 A   | 4/2004 |
| JP | 2005-501385 A   | 1/2005 |
| JP | 2005-150021 A   | 6/2005 |
| JP | 2008-66289 A    | 3/2008 |
| JP | 2009-110832 A   | 5/2009 |
| JP | 2009-176714 A   | 8/2009 |
| JP | 2011-070998 A   | 4/2011 |
| JP | 2013-045390 A   | 3/2013 |
| KR | 10-1011258 B1   | 1/2011 |
| KR | 10-2012-0082808 A | 7/2012 |
| WO | WO 02/43178 A1  | 5/2002 |
| WO | WO 2013/062662 A1 | 5/2013 |

OTHER PUBLICATIONS

Machine translation of JP-2005-150021-A, dated Jun. 9, 2005.
International Search Report issued in PCT/KR2014/008309 dated Dec. 8, 2014.

* cited by examiner

[FIG. 1]
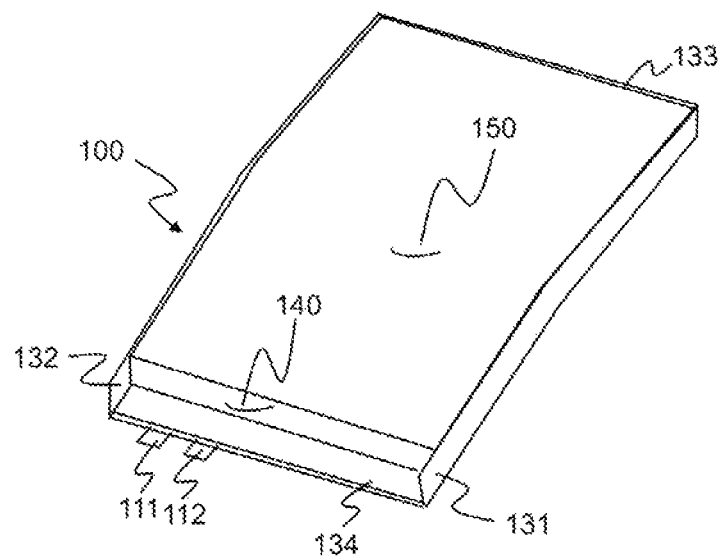

[FIG. 2]
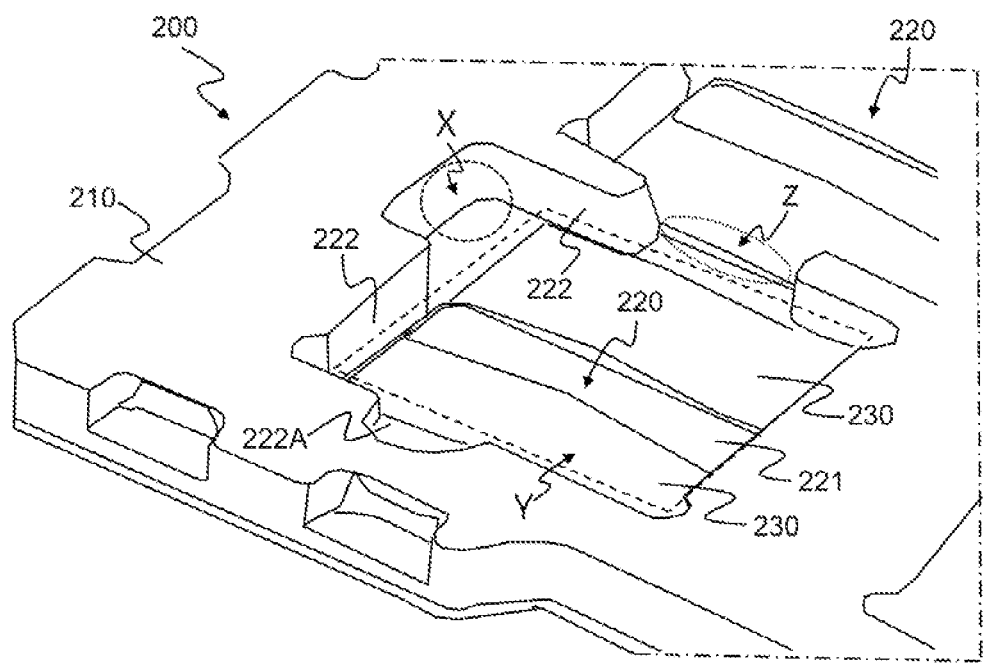

【FIG. 3】
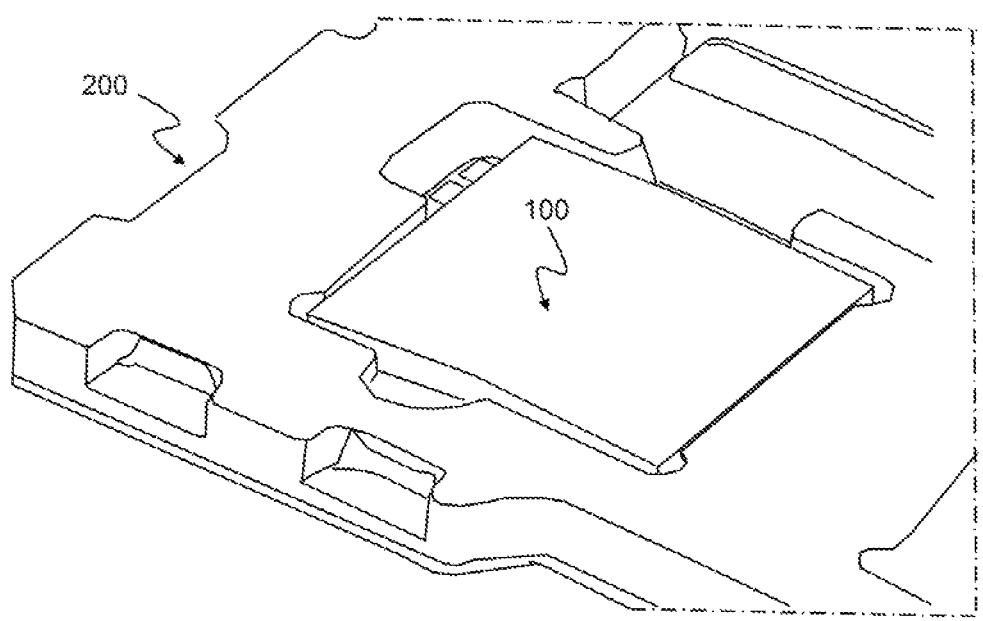

TRAY FOR CURVED SURFACE-STRUCTURED BATTERY CELL

TECHNICAL FIELD

The present invention relates to a battery cell tray for receiving a secondary battery that can be repeatedly charged and discharged and, more particularly, to a battery cell tray having a curved battery cell receiving part that is capable of improving dimensional stability of a curved battery cell.

BACKGROUND ART

With remarkable development of information technology (IT), a great variety of portable information communication devices has been popularized. As a result, in the 21$^{st}$ century, we are moving toward a ubiquitous society in which high-quality information service is possible regardless of time and place. Lithium secondary batteries are very important to realize such a ubiquitous society.

In recent years, design of electronic devices has been very important in consumers' choice of products and the electronic devices have been gradually miniaturized and thinned according to consumers' liking. To this end, there is a high necessity for miniaturizing and thinning a lithium secondary battery in order to minimize unnecessary waste of an internal space of each of the electronic devices. In addition, it is necessary for the lithium secondary battery to have various shapes corresponding to shapes of the electronic devices. In recent years, the demand for a curved battery, including a flexible battery, has increased.

In connection with this case, Korean Patent Application Publication No. 2012-0082808 discloses a curved battery. However, Korean Patent Application Publication No. 2012-0082808 only discloses a curved battery mounted in an electronic device but does not disclose problems caused from the curved battery.

DISCLOSURE

Technical Problem

The inventors of the present application have found that a curved pouch-shaped battery has a problem in that curvature of the curved pouch-shaped battery is changed due to external impact. This problem lowers dimensional stability of the battery with the result that it is difficult to mount the battery in an electronic device and, therefore, yield of batteries is decreased.

The present invention has been made in view of the above problems, and it is an object of the present invention to provide a battery cell tray having a curved battery cell receiving part that is capable of preventing curvature of a curved battery cell from being changed due to external impact and improving dimensional stability of the battery cell, thereby increasing yield of curved battery cells.

Technical Solution

In accordance with one aspect of the present invention, the above and other objects can be accomplished by the provision of a battery cell tray including a flat body and at least one battery cell mount unit formed at the flat body in a depressed shape, the battery cell mount unit including a base surface having a curved surface corresponding to a curved surface of a battery cell to be mounted in the battery cell mount unit and side walls connected between the base surface and the flat body.

In accordance with another aspect of the present invention, there is provided a battery cell tray including a flat body and at least one battery cell mount unit formed at the flat body in a depressed shape, the battery cell mount unit including a flat base surface comprising at least one rib having a curved surface corresponding to a curved surface of a battery cell to be mounted in the battery cell mount unit and side walls connected between the flat base surface and the flat body.

The term "connection" may be used as a meaning including "coupling" or "fastening" and "extending." The term "coupling" or "fastening" may mean that the base surface and the flat body are integrated into one using a fastening structure or a fastening member. The term "extending" may mean that the base surface and the flat body are integrally formed by injection molding. In this specification, coupling between separate members may be achieved using coupling methods, such as a fastening method using a coupling protrusion and a coupling groove, a bolt fastening method, and a sliding fastening method, well known in the art to which the present invention pertains.

The term "molding" may not mean that the curved surface is formed by a separate member, such as a rib, which will hereinafter be described, but mean that the base surface is formed to have a curved surface, for example, by injection molding.

The curved battery cell may be a pouch-shaped battery cell including an electrolyte, an electrode assembly having a curved stacked surface of a cathode, an anode, and a separator, electrode leads connected to electrode tabs of the electrode assembly, and a battery case having the electrolyte and the electrode assembly received in a receiving part having a curved surface corresponding to the curved surface of the electrode assembly, an opening of the battery case being sealed in a state in which the electrode leads are exposed outward.

The battery case may be made of a laminate sheet including a metal layer and a resin layer. Specifically, the laminate sheet may be an aluminum laminate sheet. The battery case made of the laminate sheet may include a lower case including a depressed receiving part and an outer edge part extending from the receiving part and an upper case coupled to the lower case by thermal bonding. According to circumstances, the upper case may include a depressed receiving part and an outer edge part extending from the receiving part. The upper case and the lower case may be separated from each other. Alternatively, the upper case and the lower case may be partially connected to each other.

The battery case made of the laminate sheet exhibits a higher degree of freedom in shape than a metal can type battery case. However, the battery case made of the laminate sheet exhibits low mechanical strength against external impact and a spring back phenomenon may easily occur in the battery case made of the laminate sheet. In order to prevent the occurrence of a spring back phenomenon due to the curved structure of the battery cell and to prevent the curvature of the battery cell from being changed due to external impact, therefore, the inventors of the present application have invented a battery cell tray having a curved battery cell mount unit The receiving part of the battery case may correspond to the receiving part of the finished pouch-shaped battery cell. The region of the battery case at which the opening is sealed may be formed at the outer edge of the receiving part of the finished pouch-shaped battery cell. Hereinafter, the sealed region may be referred to as an outer circumferential sealed portion.

In a non-limiting embodiment, the battery case may have one or more outer circumferential sealed portions bent toward an outer wall of the receiving part. Specifically, the battery case may have one or more outer circumferential sealed portions bent toward the outer wall of the receiving part excluding another outer circumferential sealed portion from which the electrode leads are exposed outward. More specifically, the electrode leads may be bent toward the unbent outer circumferential sealed portion.

The rib may be an independent structure separated from the tray. The rib may be coupled to the flat base surface using a coupling method well known in the art to which the present invention pertains.

In a non-limiting embodiment, the rib may include a first flat surface facing the flat base surface and a first curved surface opposite to the first flat surface and opposite ends of the first flat surface and the first curved surface may be connected to each other. The rib may be a structure manufactured by injection molding. Alternatively, the rib may be a structure manufactured by coupling between a first member including the first flat surface and a second member including the first curved surface.

In a non-limiting embodiment, the battery cell tray may include two or more ribs and the ribs m spaced apart from each other.

In a non-limiting embodiment, the side walls may extend from the flat body and the base surface or the flat base surface may extend from the side walls.

In a non-limiting embodiment, the side walls may be coupled to the flat body and the base surface or the flat base surface may extend from the side walls.

In a non-limiting embodiment, the side walls may be coupled to the flat body and the base surface or the flat base surface may be coupled to the side walls.

At least one of the side walls may be provided with at least one depression. The depression may provide an extra space for enabling the battery cell to be easily mounted into and separated from the battery cell mount unit, thereby improving processability.

In addition, one or more of the side walls formed between at least two adjacent battery cell mount units may be provided with depressions, which may communicate with each other in a state in which the depressions face each other.

The depressions communicating with each other may provide an extra space for enabling the respective battery cells to be easily mounted into and separated from the adjacent battery cell mount units.

In a non-limiting embodiment, at least one of the side walls may be provided with an opening.

In a non-limiting embodiment, the battery cell tray may have one battery cell mount unit. In this case, battery cell trays, each of which has one battery cell mount unit, may be referred to as sub trays. The sub trays may be coupled to each other to constitute a battery cell tray including two or more battery cell mount units. Of course, a battery cell tray including two or more battery cell mount units may be manufactured by injection molding.

The battery cell mount unit may include a battery cell body mount part having a receiving space corresponding to a shape of a body of the battery cell and an electrode lead mount part extending from a portion of the battery cell body mount part in a direction in which electrode leads protrude.

The battery cell tray may be made of an elastic material that is capable of eliminating external impact. In addition, the battery cell tray may be made of a polymer material exhibiting high electric insulativity.

DESCRIPTION OF DRAWINGS

The above and other objects, features and other advantages of the present invention will be more clearly understood from the following detailed description taken in conjunction with the accompanying drawings, in which:

FIG. 1 is a perspective view typically showing a curved battery cell according to a non-limiting embodiment of the present invention;

FIG. 2 is a perspective view typically showing a battery cell tray housing according to a non-limiting embodiment of the present invention; and FIG. 3 is a perspective view typically showing a state in which the battery cell of FIG. 1 is mounted in the battery cell tray of FIG. 2.

BEST MODE

Now, preferred embodiments of the present invention will be described in detail with reference to the accompanying drawings. It should be noted, however, that the scope of the present invention is not limited by the illustrated embodiments.

FIG. 1 is a perspective view typically showing a curved battery cell according to a non-limiting embodiment of the present invention. Referring to FIG. 1, a curved battery cell 100 is completed by sealing an opening in a state in which an electrode assembly is received in a receiving part 150 of a pouch-shaped battery case made of a laminate sheet together with an electrolyte. Of four outer circumferential sealed portions 131, 132, 133, and 134, the three outer circumferential sealed portions 131, 132, and 133 are bent toward a side 140 of the battery cell 100 excluding the outer circumferential sealed portion 134, from which electrode leads 111 and 112 are exposed outward. The electrode leads 111 and 112 are exposed outward from the outer circumferential sealed portion 134, which is not bent.

FIG. 2 is a perspective view typically showing a battery cell tray housing according to a non-limiting embodiment of the present invention and FIG. 3 is a perspective view typically showing a state in which the battery cell of FIG. 1 is mounted in the battery cell tray of FIG. 2.

Referring to FIG. 2, a battery cell tray 200 includes a flat body 210 and battery cell mount units 220 formed at the flat body 210 in a depressed shape. Each of the battery cell mount units 220 includes a flat base surface 221 and side walls 222 extending from the flat body 210 to the flat base surface 221. Two ribs 230, each of which includes a first curved surface and a first flat surface configured such that opposite ends of the first curved surface and the first flat surface are connected to each other, are mounted at the flat base surface 221. A depression 222A is formed at one of the side walls 222. Another of the side walls 222 formed between the battery cell mount units 220 such that the side wall 222 faces the depression 222A is provided with an opening Z, through which the depression 222A communicates with another depression. A region Y is a battery cell body mount part and a region X is an electrode lead mount part. The electrode lead mount part X extends from a portion of the battery cell body mount part Y in a direction in which electrode leads protrude. Referring to FIG. 3, the battery cell 100 of FIG. 1 is Mounted in one of the battery cell mount units 220, each of which is constituted by the battery cell body mount part Y and the electrode lead mount part X.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, it is possible to prevent curvature of a curved battery cell from being changed due to external impact. Consequently, the present invention has the effect of providing a curved battery cell exhibiting improved dimensional stability.

The invention claimed is:

1. A battery cell tray comprising:
at least one curved battery cell having a first curved surface and a second curved surface opposite the first curved surface, the first curved surface being convex and the second curved surface being concave;
a flat body having a planar upper surface; and
at least one battery cell mount unit is formed at the flat body in a depressed shape from the planar upper surface of the flat body, the at least one battery cell mount unit comprising a base surface having a curved surface corresponding to the second curved surface of the at least one curved battery cell mounted in the battery cell mount unit and side walls connected between the base surface and the planar upper surface of the flat body, and all side walls of the at least one battery cell mount unit extend downward from the planar upper surface of the flat body,
wherein the curved surface of the base surface fully extends from one side wall of said side walls to an opposite side wall of said side walls, and
wherein the curved surface comprises two curved surfaces spaced apart by a flat surface of the base surface, the flat surface fully extending from the one side wall of said walls to the opposite side wall of said side walls.

2. The battery cell tray according to claim 1, wherein the side walls extend from the flat body, and the base surface extends from the side walls.

3. The battery cell tray according to claim 1, wherein the side walls are coupled to the flat body, and the base surface extends from the side walls.

4. The battery cell tray according to claim 1, wherein the side walls are coupled to the flat body, and the base surface is coupled to the side walls.

5. The battery cell tray according to claim 1, wherein the at least one battery cell mount unit comprises:
a battery cell body mount part having a receiving space corresponding to a shape of a body of the at least one curved battery cell; and
an electrode lead mount part extending from a portion of the battery cell body mount part in a direction in which electrode leads protrude.

6. The battery cell tray according to claim 1, wherein at least one of the side walls is provided with an opening.

7. The battery cell tray according to claim 1, wherein at least one of the side walls is provided with at least one depression.

8. A battery cell tray comprising:
at least one curved battery cell having a first curved surface and a second curved surface opposite the first curved surface, the first curved surface being convex and the second curved surface being concave;
a flat body; and
at least one battery cell mount unit formed at the flat body in a depressed shape, the at least one battery cell mount unit comprising a flat base surface comprising at least one rib having a curved surface corresponding to the second curved surface of the at least one curved battery cell mounted in the battery cell mount unit and side walls connected between the flat base surface and the flat body,
wherein the curved surface of the at least one rib fully extends from one side wall of said side walls to an opposite side wall of said side walls, and
wherein the at least one rib comprises at least two ribs spaced apart by a flat surface of the flat base surface, the flat surface fully extending from the one side wall of said side walls to the opposite side wall of said side walls.

9. The battery cell tray according to claim 8, wherein the at least one rib comprises a first flat surface facing the flat base surface and a first curved surface of the at least one rib opposite to the first flat surface, and opposite ends of the first flat surface and the first curved surface are connected to each other.

10. The battery cell tray according to claim 8, wherein the side walls extend from the flat body, and the flat base surface extends from the side walls.

11. The battery cell tray according to claim 8, wherein the side walls are coupled to the flat body, and the flat base surface extends from the side walls.

12. The battery cell tray according to claim 8, wherein the side walls are coupled to the flat body, and the flat base surface is coupled to the side walls.

13. The battery cell tray according to claim 8, wherein the at least one battery cell mount unit comprises:
a battery cell body mount part having a receiving space corresponding to a shape of a body of the at least one curved battery cell; and
an electrode lead mount part extending from a portion of the battery cell body mount part in a direction in which electrode leads protrude.

14. The battery cell tray according to claim 8, wherein at least one of the side walls is provided with an opening.

15. The battery cell tray according to claim 8, wherein at least one of the side walls is provided with at least one depression.

16. The battery cell tray according to claim 8, wherein the at least one battery wall mount unit includes two battery wall mount units, and
wherein the two battery cell mount units are arranged adjacent each other and a corresponding side wall of each battery cell mount unit includes a depression, the corresponding side walls being adjacent each other such that the depression of each of the corresponding side walls communicate with each other in a state in which the depressions face each other.

17. A battery cell tray comprising:
two curved battery cells, each battery cell having a first curved surface and a second curved surface opposite the first curved surface, the first curved surface being convex and the second curved surface being concave;
a flat body; and
two battery cell mount units formed at the flat body in a depressed shape, each battery cell mount unit comprising a base surface having a curved surface corresponding to the second curved surface of a corresponding curved battery cell of the two curved battery cells mounted in a respective battery cell mount unit of the two battery cell mount units and side walls connected between the base surface and the flat body, wherein the two battery cell mount units are arranged adjacent each other and a corresponding side wall of each battery cell mount unit includes a depression, the corresponding side walls being adjacent each other such that the depression of each of the corresponding side walls communicate with each other in a state in which the depressions face each other.

* * * * *